United States Patent

[11] 3,617,896

[72] Inventors Thomas W. McCurnin;
 Lloyd J. Perper, both of Tucson, Ariz.
[21] Appl. No. 793,124
[22] Filed Jan. 22, 1969
[45] Patented Nov. 2, 1971
[73] Assignee The United States of America as represented by the Secretary of the Navy

[54] ELLIPTICAL FUNCTION SIMULATION SYSTEM
 5 Claims, 8 Drawing Figs.
[52] U.S. Cl. .................................................. 325/363,
 35/1, 325/58, 325/67, 343/227
[51] Int. Cl. ....................................................... H04b 1/00
[50] Field of Search ............................................ 325/51, 53,
 54, 58, 67, 363; 343/225, 227, 100, 103; 35/1;
 235/193.5

[56] References Cited
UNITED STATES PATENTS
3,310,741  3/1967  Vitermark et al. ............  325/51 X Primary Examiner—Robert L. Griffin
Assistant Examiner—R. S. Bell
Attorneys—Raymond I. Tompkins and Charles D. B. Curry ABSTRACT: A simulation system including a control device, a master transmitter, a plurality of slave transmitters and a plurality of receivers. The master and slave transmitters are physically spaced apart and their transmission signals form a hyperbolic grid network. The receivers are positioned within the hyperbolic grid network and process the signals from the master and slave transmitters to simulate dose and dose rate from yield and fallout information of a simulated detonation that takes place in the hyperbolic grid network. The yield ($Yi$) information is processed by the receivers as a pulse train having a frequency that decreases exponentially with time. The X and Y rectangular coordinate information is converted into the polar coordinate system to eliminate the necessity of performing complex square or square root functions for detecting the actual distance R. To determine fallout the actual distance R is converted to an effective distance $R_E$ to take into account wind direction and velocity by employing an elliptical function where the eccentricity ($e$) is a function of wind velocity and the angle ($\Phi$) of the major axis is a function of wind direction.

PATENTED NOV 2 1971          3,617,896

INVENTORS
THOMAS J. MC CURNIN
BY  LLOYD J. PERPER

Charles P B Curry
ATTORNEY

ELLIPTICAL FUNCTION SIMULATION SYSTEM

The invention described herein may be manufactured and used by or for the Government of the United States of America for governmental purposes without the payment of any royalties thereon or therefor.

The present invention relates to a radiation simulation system and more particularly to the method of simulating detonation yield and radiation fallout.

The present invention may be advantageously used with different simulation systems; however, it has been found to be particularly suitable for use in a simulation system based on the hyperbolic grid line network such as described in copending patent applications Ser. No. 748,747, filed July 30, 1968 and Ser. No. 773,451, filed Nov. 5, 1968. Briefly, simulation systems based on the hyperbolic grid network include a master transmitter and a plurality slave transmitters and a control device. The master and slave transmitters are physically spaced apart and their interacting transmission signals form a hyperbolic grid network. The master transmitter operates in both the control mode and in the simulation mode. The typical system employs two pairs of transmitters where the first pair comprises the master transmitter (when operating in the simulation mode) and a slave transmitter and the second pair comprises two slave transmitters. A square field network is set up where the first pair (master and slave) of transmitters are positioned at opposite ends of one diagonal of the square field and the second pair (two slaves) are positioned at opposite ends of the other diagonal of the square field. The diagonal distance between the transmitters may be of the order of one hundred miles. The plurality of receivers are carried by the troops within the area formed by the square field network. Each receiver functions to determine the fallout at the location of the receiver in terms of dose rate and total dose taking into account such factors as the location of the detonation, the location of the receiver, the yield of the detonation, the direction of the wind and the velocity of the wind.

When the master transmitter is transmitting in the command or control mode, it transmits control signals for controlling the slave transmitters and for controlling the receivers positioned in the hyperbolic grid network. When the master transmitter is transmitting in the simulation mode, it transmits a simulation signal for reception by the receivers in the network. This simulation signal from the master transmitter is compared in the receivers with the simulation signal transmitted by the slave transmitter which it is paired with and is on the same diagonal as the master transmitter. Preferably the slave transmitter transmits only one type of signal which is a simulation signal for reception by the receivers positioned within the network.

The point of initial detonation or the zero—zero point (0,0) can be varied within the area covered by the hyperbolic grid network by the appropriate choice of transmitter signal phases. This is achieved by causing the phase of one of the transmitters of each of the pair to lead or lag the phase of the other transmitters in their respective pairs.

The control signals generated by the master transmitter are dictated by the control program of the control computer. This control program will control the following parameters, for example. First, it controls the transmitting sequence, timing and detonation of simulation transmission signals of the master and slave transmitters. Second, it controls the modulation frequency of the master and slave transmitter. Third, it controls the phase relationship of the modulation frequency between the respective pairs of transmitters. Fourth, it controls the yield data ($Yi$) and fallout data [which include wind direction ($\Phi$) and velocity defined in terms of elliptical information ($e$)] that are transmitted to the receivers. Fifth, it applies appropriate controls to the receivers for handling the signals from the master and slave transmitters and for handling the yield, fallout and other data.

The simulation exercises are performed by the field receivers receiving and processing the control signals from the master transmitter and the simulation signals from the master and slave transmitters. Since the time and phase of the transmitted pairs of signals are interdependent and since the velocity of propagation is constant and is known, the phase difference of the pairs of transmission will determine distances (X and Y) from the zero—zero reference point in the hyperbolic and rectangular coordinate system. That is, the phase difference between the signals received by the field receiver from the first pair of transmitters will represent the distance X in the X direction of the particular receiver from the zero—zero reference point. Whereas the phase difference between the signals received by the field receiver from the second pair of transmitters will represent the distance Y in the Y direction of the particular receiver from the zero—zero reference point. Knowing the X and Y distance each receiver then processes these signals to determine the actual distance R of each receiver from the zero—zero reference point which may be used in the polar coordinate system. This may be performed by receivers electronically squaring the X and Y values, summing these squared values and taking the square root of this sum ($R=\sqrt{X^2+Y^2}$).

It should be noted that the electronic circuitry required for performing squaring and square root operations are quite involved and where it is necessary to have a small portable receiver having a high degree of reliability it is desirable to simplify the electronic circuitry as much as possible provided sufficient accuracy is obtained. This has been achieved by defining R in the polar coordinate system where R may be defined within 4 percent accuracy as $R=0.961X+0.4Y$ when $\theta$ is less than 45° and $R=0.4X+0.961Y$ when $\theta$ is more than 45° where $\theta$ is the angle of the receiver from the zero—zero point when referenced from the X direction. A diode-switching circuit is employed to selectively use these definitions of R when the angle varies throughout the grid quadrants.

To determine the actual simulated dose (D) at each receiver it is necessary for each receiver to know the yield ($Yi$) of the detonation at the zero—zero reference point. This information is transmitted to the field receivers by a unique pulse-coding technique in which the pulse rate of a pulse train decreases exponentially with time or distance from the zero—zero point. This pulse train can be either generated at the master transmitter or the master transmitter can generate a digital control signal that causes each receiver to generate its own pulse train the pulse rate of which decreases exponentially with time.

Knowing the yield ($Yi$) and the distance ($R$), each receiver may electronically process this information to determine the dose (D) by dividing the yield ($Yi$) by the cube of the distance ($R$) [$D=Yi/R^3$]. This relationship, however, does not take into account the wind direction and wind-intensity factors. To take into account these wind factors it has been found that the actual distance R can be modified in a unique manner to be an effective distance $R_E$. This is done by defining constant dose-rate levels in terms of an ellipse. In this manner a family of ellipses may be defined for a predetermined set of wind direction ($\Phi$) and eccentricity ($e$) conditions that will define the dose rate of any receiver in the hyperbolic grid network as defined by the equation $D=Yi/R_E^3$ Taking into account the above-described factor it has been discovered that the effective distance ($R_E$) may be described as $R_E=Q[R-X\,e\cos\Phi-Ye\sin\Phi]$ where $R_E$ is the effective distance of the receiver from the ellipse focal point which is also the zero—zero reference point, $Q$ is a scaling factor to change the size of the ellipse but not its shape, $R$ is the actual distance of the receiver from the ellipse focal point, $X$ is the distance in the -direction from the ellipse focal point to the receiver, $Y$ is the distance in the Y-direction from the ellipse focal point to the receiver, $e$ is the eccentricity of the ellipse which varies as a function of wind velocity and $\Phi$ is the angle of the major axis of the ellipse relative to the positive X-coordinate direction. In accordance with the present invention the operations defined in this relationship are performed by unique electronic circuitry techniques and in cooperation with the circuitry for detecting $X$, $Y$, $Yi$ and the exponential decay signals are provided indicating dose rate ($D$) and total dose.

Other objects, advantages and novel features of the invention will become apparent from the following detailed description of the invention when considered in conjunction with the accompanying drawings wherein.

Figure 1:
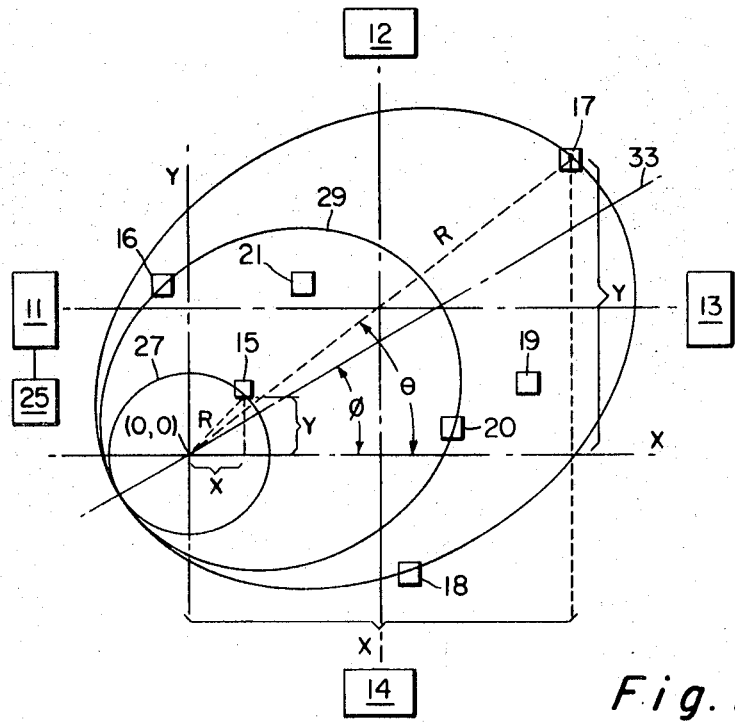
FIG. 1 is an illustration of the hyperbolic grid network of the simulation system of the present invention.

In FIG. 1 is illustrated the hyperbolic grid network of the simulation system with which the present invention is concerned. A detailed description of the operation of this system is described in copending patent applications Ser. No. 748,747 and Ser. No. 773,451. Briefly, the hyperbolic grid network of FIG. 1 includes master transmitter 11, slave transmitter 12, slave transmitter 13 and slave transmitter 14. The master transmitter 11 transmits in two different modes. One is the command or control mode where it transmits a control signal for controlling slave transmitters 12, 13 and 14 and receivers 15 through 21. The other is the simulation mode where it transmits a simulation signal for reception by receivers 15 through 21 that are positioned within the hyperbolic grid. This simulation signal from master transmitter 11 is compared in the receivers with the simulation signal transmitted by slave transmitter 13. Preferably the slave transmitters transmit only one type of signal. This signal is a simulation signal for reception by receivers 15 through 21 positioned within the hyperbolic grid network. That is, in receivers 15 through 21 the signal from slave transmitter 12 is compared with the signal from slave transmitter 14 and the signal from slave transmitter 13 is compared with the signal from master transmitter 11 when operating in the simulation mode. The zero—zero point (0,0) of the hyperbolic grid network is established by the predetermined phase relationships of the master transmitter 11 (when operating in the simulation mode) and the slave transmitters 12, 13 and 14 and can be established at any point within the hyperbolic grid network as described in copending patent application Ser. No. 748,747.

The control signals generated by master transmitter 11 are dictated by the control program of control computer 25. This control program will control the following parameters, for example. First, it controls the transmitting sequence, timing and duration of simulation transmission signals of master transmitter 11 and slave transmitters 12, 13 and 14. Second, it controls the modulation frequency of master transmitter 11 and slave transmitters 12, 13 and 14. Third, it controls the phase relationship of the modulation frequency between master transmitter 11 and slave transmitter 13 and between slave transmitter 12 and slave transmitter 14. Fourth, it controls the yield data ($Yi$) and fallout data [which includes wind direction ($\Phi$) and velocity defined in terms of elliptical information (eccentricity, $e$) as hereinafter described] that is transmitted to receivers 15 through 21. Fifth, it applies appropriate controls to receivers 15 through 21 for handling the signals from master transmitter 11 and slave transmitters 12, 13 and 14 and for handling the yield, fallout and other data.

The present invention is principally directed to techniques for defining the yield and fallout data and to techniques for handling these data in the receivers.

It has been found that two geometric figures may be effectively used to reliably describe the simulation of a nuclear detonation. For initial burst simulation a circular pattern is employed. For fallout simulation a figure approximately elliptical in shape is employed. Both of these can be obtained using the hyperbolic grid system. It has been found that the small error introduced by defining the circle and ellipse in the rectangular coordinate system and implementing them from the curvilinear coordinate system, generated by the hyperbolic lines of constant phase, is well within the permissible error limits of simulation systems.

It should be particularly noted that the information generated within each of receivers 15 through 21 within the hyperbolic grid network is the $X$ distance and the $Y$ distance measured in the hyperbolic system from the zero—zero (0,0) point of the simulated field to the individual receivers. That is, each receiver will determine its own position in terms of $X$ and $Y$ as illustrated in FIG. 1.

The initial burst radiation pattern is circular, as shown by curve 27 of FIG. 1, because the wind will have little effect on the radiation level in the immediate vicinity of the detonation and the dose rate within the circle is very nearly uniform. Curve 27 of FIG. 1 is shown larger than would be normally encountered for purpose of illustration. The radius of circle 27 would be from several hundred yards to several miles depending upon the yield level ($Y_i$) of the detonation at the zero—zero point. For a given yield ($Y_i$) the dose rate or instantaneous level of radiation within the circle is the same at all points.

Receivers 15 through 21 are illustrated as being at various positions within the hyperbolic grid network and the distance of each receiver from the zero—zero point may be defined by the relationship:

$$(1) \qquad R = (X^2 + Y^2)^{1/2}$$

where $R$ is the actual distance of the particular receiver from the zero—zero point, $X$ is the distance of the particular receiver from the zero—zero point in the $X$ direction, and $Y$ is the distance of the particular receiver from the zero—zero point in the $Y$ direction.

Circle 27 may be described by equation (1) when a receiver, such as receiver 15, is on the circle. When outside of circle 27 the dose rate decays exponentially with distance as may be defined by the relationship:

$$(2) \qquad D = \frac{Y_i}{R^\alpha} = \frac{Y_i}{R^3}$$

where $D$ is the dose rate which is a measure of the instantaneous radiation level in rads at a particular receiver, $Y_i$ is the yield of the detonation at the zero—zero point, $R$ is the distance of the particular receiver from the zero—zero point, and $\alpha$ is the exponential decay factor having a typical value of three.

Equation (2) defines the dose rate ($D$) for a given yield ($Y_i$) at a particular receiver located a distance $R$ from the zero—zero point. However, when wind-direction and intensity are taken into account it is necessary to modify the relationship defined in equation (2) and this is done, in accordance with the present invention, by modifying the actual distance to be an effective distance $R_E$. This is performed by defining constant dose-rate levels in terms of an ellipse. That is, when there is no wind, then lines of constant dose would be represented by a plurality of concentric circles; however, when there is a wind then lines of constant dose would be defined by a family of ellipses, such ellipses 29 and 31 of FIG. 1. Ellipse 29 represents a constant dose rate such that all receivers on that ellipse, such as receivers 16 and 20, would be at the same dose rate. In addition, all receivers on ellipse 31 would be at the same dose-rate level but at a dose-rate level that is less than that of the receivers on ellipse 29. In this manner a family of ellipses may be defined for a predetermined set of wind direction ($\Phi$) and intensity ($e$) conditions that will define the dose rate of any receiver in the hyperbolic grid network defined by the equation:

$$(3) \qquad D = \frac{Y_i}{R_E^\alpha} = \frac{Y_i}{R_E^3}$$

where D is the dose rate of a particular receiver, $Y_i$ is the yield at the zero—zero point, and $R_E$ is the effective distance (as distinguished from the actual distance $R$) of the particular receiver from the zero—zero point.

The equation for an ellipse defined in the polar coordinate system with the major and minor axis respectively in the X and Y directions may be defined as:

$$(4) \quad R = \frac{P}{1 - e \cos \theta}$$

where R is the distance to any point on the ellipse from the focus or the zero—zero point in the direction $\theta$, $P$ is a scale factor or size parameter of the ellipse, and e is the eccentricity which is defined as the major axis divided by the minor axis.

By selecting different values of $e$ it is possible to change the shape of the ellipse to represent different wind velocities. For example, if $E=1$ then equation (4) defines a circle and there is no wind. When $e=2$ then equation (4) will represent a wind velocity of 10 miles per hour, for example, and when $E=4$ it would represent a wind velocity of 20 miles per hour, for example. The overall size, not the shape, of the ellipse may be changed by changing the values of $P$. However, in practice of the present invention it has been found the size parameter of $P=1$ is satisfactory for most situations.

Referring to FIG. 1 it can be seen that in the hyperbolic system that the X and Y coordinates remain in fixed directions as defined by the positions of master transmitter 11 and slave transmitter 12, 13 and 14. Therefore, equation (4) defines only special cases of wind directions, that is, wind in the X or Y directions. However, to provide a flexible system it is necessary to be able to simulate wind blowing in any direction such as in the direction along line 33 which is at an angle $\Phi$ from the X direction.

The equation for an ellipse with the major axis along a line $\theta = \Phi$, where $\Phi$ is shown in FIG. 1 and is measured positive counterclockwise from $\theta = 0$ is defined as:

$$(5) \quad R = \frac{P}{1 - e \cos (\theta - \phi)} = \frac{P}{1 - e (\cos \theta \cos \phi + \sin \theta \sin \phi)}$$

As previously described equation (2) expresses a figure representing constant values of dose rate at a given distance $R$. Since the indicated function of dose-rate is a function of $R$, and since the basic measurement performed in the system is distance from a center or zero—zero point, the indicated range is modified by ellipse information to define the actual fallout. It is necessary that the actual distance $R$ be modified in such a way that range values given in equation (5) result in constant values of effective range $R_E$. This will be achieved if:

$P$(Constant)$=R[1-e(\cos \theta \cos \Phi + \sin \theta \sin \Phi)]$ (6)$\chi$(Constant)$=RC1e R \cos \theta \cos \Phi - e R \sin \theta \sin \Phi$.

Since the measurement of $R$ is made in rectangular coordinate it is necessary to express equation (5) in the Cartesian form:

(7) $P$(Constant)$=(X^2+Y^2)^{1/2} - e \cos \Phi (X) - e \sin \Phi (Y)$

Equation (7) represents the equation for constant effective radius $R_E$ along the desired ellipse and may be also expressed as:

(8) $PR_E = (X^2+Y^2)^{1/2} - X e \cos \Phi - Y e \sin \Phi$ or as:

(9) $R_E = Q[(X^2+Y^2)^{1/2} - X e \cos \Phi - Y e \sin \Phi]$

(10) $R_E = Q[R - X e \cos \Phi - Y e \sin \Phi]$ where $R_E$ is the effective distance of the receiver from the ellipse focal point which is also the zero—zero point, $Q=1/P$, $R$ is the actual distance of the receiver from the ellipse focal point, $X$ is the distance in the X direction from the ellipse focal point to the receiver, $Y$ is the distance in the Y direction from the ellipse focal point to the receiver, $e$ is the eccentricity of the ellipse, and $\Phi$ is the angle of the major axis of the ellipse relative to the positive X-coordinate direction.

Figure 2:
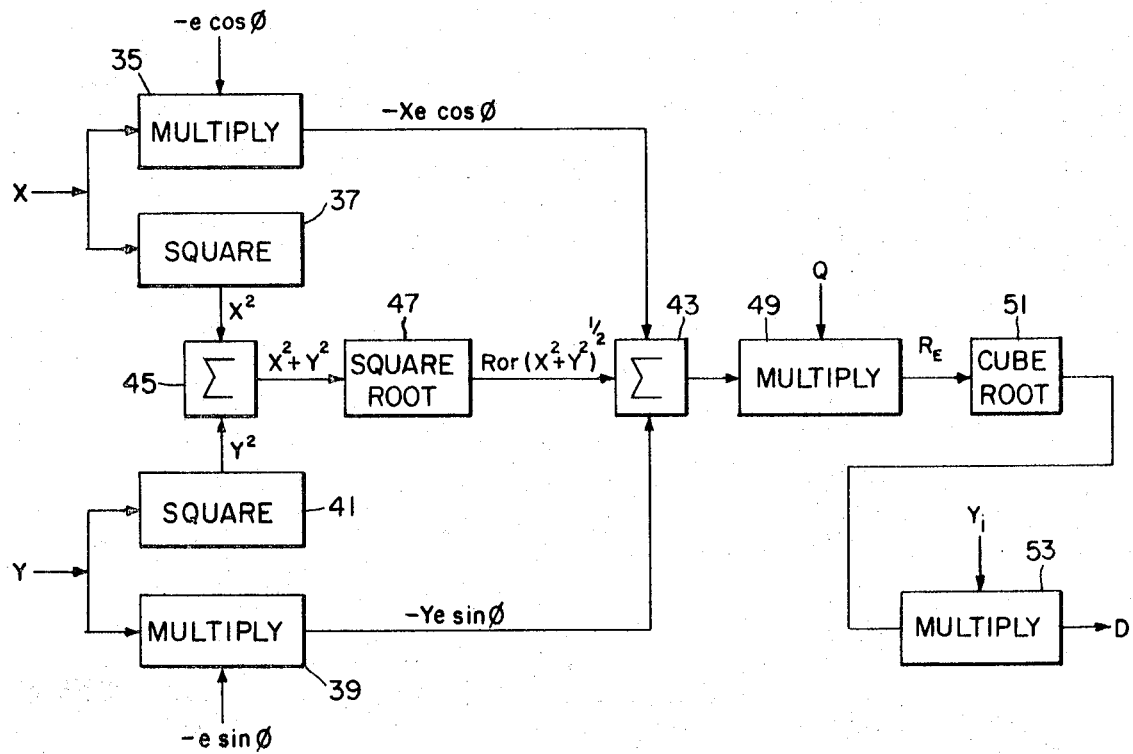
FIG. 2 is a block diagram illustrating the overall system operations of the present invention.

The operations defined in equations (9) and (10) are implemented in the system shown in FIG. 2. In this system, the receiver signal having the X-information is applied to the inputs of multiply device 35 and square device 37. The receiver signal having the Y information is applied to the inputs of multiply device 39 and square device 41. In multiply device 35 the X-signal is multiplied by the $-e \cos \Phi$ signal providing an output signal of $-X e \cos \Phi$ which is applied to one input of summing device 43. In multiply device 39 the Y signal is multiplied by the $-e \sin \Phi$-signal providing an output signal of $-Y e \sin \Phi$ which is applied to another input of summing device 43. In multiply device 39 the Y signal is multiplied by the $-e \sin \Phi$-signal providing an output signal of $-Y_e \sin \Phi$ which is applied to another input of summing device 43.

It should be noted that the $-e \cos \Phi$ and $-e \sin \Phi$ signals are predetermined coded signals dictated by the program of control computer 25 and transmitted by master transmitter 11 to all receivers during its control mode of operation.

The $X^2$ output of square device 37 is applied to one input of summing device 45 and the $Y^2$ output of square device 41 is applied to the other input of summing device 45. The output of summing device 45 is applied to the input of square root device 47 which provides an output of $(X^2+Y^2)^{1/2}$ or the actual distance $R$ of the receiver from the zero—zero point in the hyperbolic grid network. This output of square root device 47 is applied to another input of summing device 43, the output of which is the bracketed terms of equations (9) and (10). The output of summing device 43 is applied to the input or multiply device 49 where it is multiplied by $Q$ provides an output $(R_E)$ as described in equations (9) and (10). The parameter $Q$, like the parameters $e$ and $\Phi$, is determined by control computer 25 and information describing these parameters is transmitted to all receivers by master transmitter 11 during its control mode of operation. As previously stated the output signal $R_E$ is the effective distance, as distinguished from the actual distance $R$, of the receiver from the zero—zero point in the hyperbolic grid network. This effective distance $R_E$ takes into account the wind direction $\Phi$ and the wind velocity as described by the eccentricity $e$ of the ellipse. $Q$ or $P$ are linear scaling factors to increase or decrease the size of the ellipse without changing its shape, and in practice of the present invention is typically taken as unity.

To determine the actual simulated dose rate fallout ($D$) at the receiver the radioactive decay and the yield ($Y_i$) of the detonation at point zero—zero must be taken into account. In the FIG. 2 circuit the output signal $R_E$ of multiply circuit 49 is applied to the input of cube root device 51 the output of which is applied to one input of multiply device 53. The yield ($Y_i$) of the detonation at point zero—zero is applied to the other input of multiply device 53 which provides an output signal-defining dose rate $D$ at the particular receiver. The operations performed by cube root device 51 and multiply device 53 implement equation (3). The decay is shown as varying inversely with the cube root of the effective distance ($R_E$) of the receiver from the zero—zero point. It is to be understood that, depending upon the type of detonation, its elevation and other factors, the decay may be more accurately described by some function other than the cube root, such as by some root either greater or lesser than the cube root. The yield ($Y_i$) information is dependent on the size of the particular simulated detonation and is determined by control computer 25 and information describing the yield ($Y_i$), is transmitted to the receiver by master transmitter 11 during its control mode of operation.

As previously described the vector distance $R$ may be determined from the equation (1) relationship:

(1) $R=(X^2+Y^2)^{1/2}$

However, it should be noted that the electronic circuitry of FIG. 2 required for performing the mathematical computation defined in equation (1) is quite involved and where it is necessary to have a small portable receiver having a high degree of reliability and repeatability it is desirable to simplify the electronic circuitry as much as possible provided sufficient accuracy is attained. In determining the dose and dose rate (D) in simulation systems errors of several percentage points are permissible. Therefore, in accordance with the present invention it has been found desirable to determine the vector distance $R$ by other techniques. Referring to FIG. 1 it can be seen that $X$, $Y$ and $R$ can be related to the angle $\theta$ by the expression:

(11) $R = X \sec \theta$ where $R$ and $X$ are defined as in equation (1) and $\theta$ is the angle from the ground zero—zero point to the individual receiver when referenced from the $X$ direction as indicated in FIG. 1.

It has been found that a good approximation for sec $\theta$ may be made when $\theta<45°$ by the relationship:

(12)     sec $\theta = 0.961 + 0.4 \tan \theta$

The values of sec $\theta$ determined by conventional techniques for various angles up to 45° are compared to the values of sec $\theta$ determined by equation (12) in TABLE I below.

TABLE I

| $\theta$ | Sec $\theta$ | Tan $\theta$ | 0.961 +0.4 tan $\theta$ | Difference | Percent distortion |
|---|---|---|---|---|---|
| 0° | 1.00000 | 0.00000 | 0.96100 | −0.03900 | −3.9 |
| 5° | 1.00382 | 0.08748 | 0.99599 | −0.00783 | −0.78 |
| 10° | 1.01543 | 0.17632 | 1.03152 | +0.01610 | +1.59 |
| 15° | 1.03528 | 0.26795 | 1.06818 | +0.03290 | +3.18 |
| 20° | 1.06418 | 0.36397 | 1.10659 | +0.04240 | +4.00 |
| 25° | 1.10338 | 0.46631 | 1.14752 | +0.04414 | +4.02 |
| 30° | 1.15470 | 0.57735 | 1.19194 | +0.03724 | +3.24 |
| 35° | 1.22077 | 0.70021 | 1.24108 | +0.02031 | +1.66 |
| 40° | 1.30541 | 0.83909 | 1.29664 | −0.00877 | −0.67 |
| 45° | 1.41421 | 1.00000 | 1.36100 | −0.05321 | −3.76 |

From TABLE I it can be seen that the maximum error for determining sec $\theta$ by equation (12) is 4 percent which is well within the permissible error limits for most radiation simulation systems.

Therefore, by combining equations (11) and (12) $R$ may be expressed in terms of $X$ and $Y$ by the expressions:

$R = X(0.961 + 0.4 \tan \theta)$, or $R = X(0.961 + 0.4Y/X)$, or

(13)     $R = 0.961X + 0.4 Y$

Figure 3:
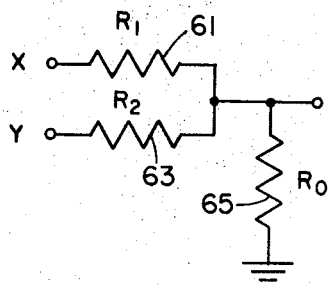
FIG. 3 is a schematic diagram of a circuit used to determine the distance $R$ when $\theta \leq 45°$.

From the equation (13) expression it is possible to determine $R$ from the known values of $X$ and $Y$ within 4 percent accuracy where $\theta<45°$ by the circuit shown in FIG. 3. In FIG. 3 is shown a linear resistive adding network where the $X$ input signal is applied to resistor 61 and the $Y$ input signal is applied to resistor 63 where the values of resistors 61 and 63 respectively are selected to apply the constants 0.961 and 0.4 as defined in equation (13). These $X$ and $Y$ signals with the correct selected constants are summed and applied across resistor 65. The output signal $E_o$ is taken across resistor 65 where the magnitude of the $E_o$ signal represents the distance $R$. The resistance of resistors 61, 63 and 65 are respectively represented by the symbols $R_1$, $R_2$ and $R_0$.

While the system defined in equation (12) and mechanized in FIG. 3 has considerable utility it nevertheless has limitations because it is necessary to position the receiver within the grid network of the simulation system so that the angle $\theta$ is not greater than 45°. This is a limit to system flexibility and it is therefore desirable to overcome this disadvantage. To overcome this disadvantage it was discovered that the angle $\theta$ may be taken up to a full 90° (or a full 360° with appropriate sign changes) if the reference axis is reversed from the $X$ to the $Y$ axis when $\theta<45°$. That is, when $\theta<45°$ the expression in equation (13) is used; however, when $\theta>45°$ and $<90°$ then $R$ may be defined by the expression:

(14)     $R = 0.4X + 0.961Y$

From the equation (14) expression it can be seen that the constants applied to the $X$ and $Y$ directions are reversed as compared to the relationship defined in equation (13).

Therefore, when $\theta<45° R$ is defined by the equation (13) relationship and when $\theta>45°$ and $<90°$ then $R$ is defined by the equation (14) relationship. This then permits $\theta$ to be 90° or a full 360° with the application of appropriate signs.

Figure 4:
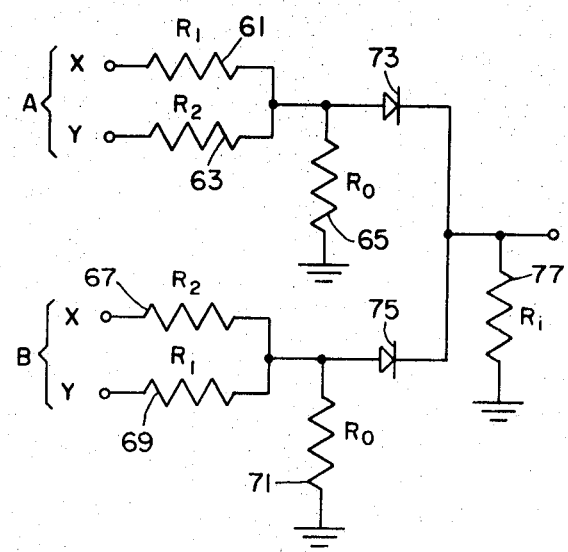
FIG. 4 is a schematic diagram of a circuit used to determine the distance $R$ when $\theta$ is any angle.

The electrical network of the present invention that implements equations (13) and (14) is shown in FIG. 4. At the outset it should be noted that when $X>Y$ then $\theta<45$ and $X<Y$ then $\theta>45$. This concept is utilized in the circuit shown in FIG. 4 where the A network information is used when $X>Y$ or $\theta<45°$ and the B-network is used when $X<Y$ or $\theta>45°$ The A network implements equation (13) and is the same as the network shown in FIG. 3 and includes resistors 61 and 63 to which are respectively applied the $X$ and $Y$ -voltage signals. The B-network implements equation (14) and includes resistors 67 and 69 to which are respectively applied the $X$ and $Y$ input signals. The output of resistors 67 and 69 is summed across resistor 71.

To illustrate the operation, equations (13) and (14) are restated below and assumed values of $X$ and $Y$ will be used to illustrate how the circuit distinguishes $X>Y$ and $X<Y$ in 1, 2 and 3.

(13)     $R = 0.96 X + 0.4 Y$
(14)     $R = 0.4 X + 0.96 Y$

EXAMPLE (1)—Assume $X=1$ and $Y=0.9$ ($\theta<45°$), then
(13)     $R = 0.96 (1) + 0.4 (0.9) = 1.32$ (A Circuit)
(14)     $R = 0.4 (1) + 0.96 (0.9) = 1.26$ (B Circuit)

EXAMPLE (2)—Assume $X=0.9$ and $Y=1$ ($\theta>45°$), then
(13)     $R = 0.96(0.9) + 0.4(1) = 1.26$ (A Circuit)
(14)     $R = 0.4(0.9) + 0.96 (1) = 1.32$ (B circuit)

EXAMPLE (3)—Assume $X=1$ and $Y=1$ ($\theta=45°$), then
(13)     $R = 0.96 (1) + 0.4 (1) = 1.36$ (A Circuit)
(14)     $R = 0.4 (1) + 0.96 (1) = 1.36$ (B Circuit)

From this illustration it can be seen that when $\theta<45°$ the output of the $A$-circuit is greater than the output of the $B$-circuit and when $\theta>45°$ then the output of the $B$-circuit is greater than the output of the $A$-circuit. Diodes 73 and 75 are respectively connected in series with the $A$- and $B$-circuits and to one side of the output load resistor 77. It should be particularly noted that the cathodes of diodes 73 and 75 are interconnected so that the $A$ and $B$-circuits back-bias each other. Therefore, when the voltage output of the $A$-circuit is greater than the voltage output of the $B'$-circuit, as in Example I, then *the cathode of diode 75 is at a greater voltage than the anode and no current will pass therethrough. Therefore, load resistor 77 will see only the voltage output of the $A$*-circuit which implements equation (13) and represents $R$ when $\theta<45°$ or $X>Y$. Conversely, when the voltage output of the $B$-circuit is greater than the voltage output of the $A$-circuit, as in example II, then the cathode of diode 73 is at a greater voltage than the anode and no current will pass therethrough. Therefore, load resistor 77 will see only the voltage output of the $B$-circuit, which implements equation (14) and represents $R$ when $\theta>45°$ or $X<Y$. When $\theta=45°$ or $X=Y$ as in EXAMPLE III then load resistor 77 will see the maximum or peak voltage of the $A$- and $B$-circuits.

From this it can be seen that FIG. 4 circuit will measure $R$ through a full 90°, or 360° when describing all four quadrants, of the hyperbolic network. It should be noted that the above-described analog operation may be implemented by digital techniques as well. For example, the $X$ and $Y$-information may be represented in digital format and digital logic may be employed to implement equations (13) and (14). One such approach would be to digitally gate the $A$-circuit "on" and the $B$-circuit "off," when $\theta<45°$ or $X<Y$, and to digitally gate the $A$-circuit "off" and the $B$-circuit "on" when $\theta<45°$ or $X>Y$.

Figure 5:
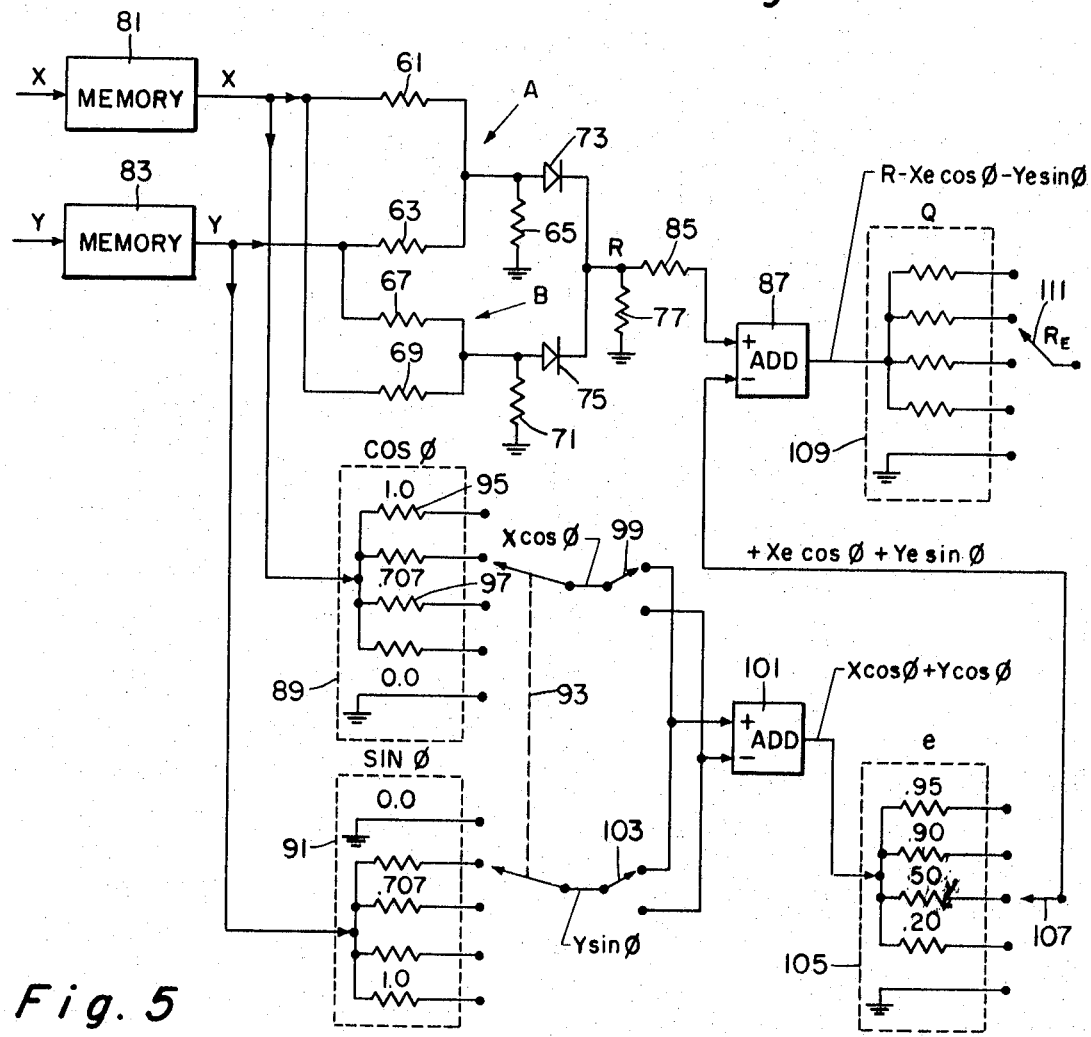
FIG. 5 is a schematic diagram of the circuit used to determine the signal representing the effective distance $R_E$.

In FIG. 5 is illustrated a system for obtaining the effective distance ($R_E$) as generally described in reference to FIG. 2 and defined in equations (9) and (10). In this system the $X$ and $Y$ signals are respectively retained in memory circuits 81 and 83. The electrical signal representing $R$ is obtained from the $A$ and $B$ circuits as described in relation to FIG. 4 and is applied through current limiting resistor 85 to one input of ADD circuit 87.

The cos $\theta$ and sin $\theta$ functions are respectively obtained from resistance networks 89 and 91. The distance $X$ is applied to the input of resistance network 89 where it is multiplied by cos $\Phi$ and the distance $Y$ is applied to the input of resistance network 91 where it is multiplied by sin $\Phi$. These networks are arranged so that a single setting of gang switch 93 results in both the cosine and the sine of the particular angle $\Phi$ being simultaneously obtained. That is, the position of gang switch will be determined by a digital signal from the master transmitter representing a predetermined angle $\Phi$ describing the wind direction. For simplicity of illustration the switching is shown as a mechanical gang switch; however, in actual practice it may be a plurality of electronic gates that are actuated by digital signals to provide the electrical switching of gang switch 93. To illustrate the operation of resistance networks 89 and 91 assume that the digital signal indicates that the wind direction or the angle $\Phi$ is 0°. In this situation the gang switch will assume the uppermost position in FIG. 5 and the cos $\Phi$ function will have a resistance equivalent to 1.0 and the sin $\Phi$ function will have zero resistance or 0.0. Conversely if the wind direction is $\Phi=90°$ then the cos $\Phi$ function will have a zero resistance and the sin $\Phi$ function will have a resistance equivalent to 1.0. The angles between 0° and 90° will have appropriate values of resistance, for example, at $\Phi=45°$ the resistance of each of cos $\Phi$ and sin $\Phi$ will be equivalent to 0.707. These equivalent values are ratios of the resistance of the resistors in networks 89 and 91. For example, if the resistance of resistor 95 is 10,000 ohms, then the resistance of resistor 97 would be 7,070 ohms thereby providing the ratio .707 to 1.000.

The output ($X \cos \Phi$) of resistance network 89 is applied through switch 99 to either the + or − inputs of ADD circuit 101. The output ($Y \sin \Phi$) of resistance network 91 is applied through switch 103 to either the + or − inputs of ADD circuit 101. Switches 99 and 103 may be electronic switches and their particular positions describe the sign of the sine and cosine terms depending upon the quadrant of the angle $\Phi$. In ADD circuit 101 the $Y \sin \Phi$ and $X \cos \Phi$ terms are summed, with their appropriate signs being determined by switches 99 and 103. However, it is still necessary to modify the $Y \sin \Phi$ and $X \cos \Phi$ terms by multiplying each by the eccentricity ($e$) of the ellipse which defines the wind velocity. This is done in resistance network 105 where the position of switch 107 is determined by a digital control signal from master transmitter 11. Selective positioning of switch 107 will determine the amount of resistance to be applied in series with the $X \cos \Phi$ +$Y \sin \Phi$ signal that is applied to its input. The output of resistance network 105 is applied to the negative input of ADD circuit 87 where it is added to $R$. Because ADD circuit 87 converts the $+X e \cos \Phi + Ye \sin \Phi$ signal into a negative signal $-X e \cos \Phi - Y e \sin \Phi$ and then adds to $R$ it actually performs a subtraction operation. This same result could be achieved if ADD circuit 87 did not change the sign of the input signal and switches 99 and 103 were in their negative positions.

The output of ADD circuit 87 is then applied to the input of resistance network 109 where the scale factor $Q$ is determined by the position of switch 111 as established by a digital control signal from master transmitter 11. The position of switch 111 determines the amount of resistance applied in series with the signal $R - X e \cos \Phi - Y e \sin \Phi$ that is applied to its input. The output of resistance network 109 represents the effective distance $R_E$ as defined by equations (9) and (10).

As previously described the dose-rate $D$ is determined from the relationship defined in equation (3):

(3) $\quad D = Y_i / R_E^3$

The yield ($Y_i$) of equation (3) will vary for different exercises and, to have a flexible system, it is necessary to provide one that has different yields. It should also be noted that for a typical third-power exponential decay as defined in equation (3) it is necessary to cube the effective distance $R_E$ and divide it into the yield $Y_i$. By conventional techniques this would require very complex electronics and for this reason a relatively simple electronic system has been devised for performing this operation as shown in FIGS. 6, 7 and 8.

Figure 6:
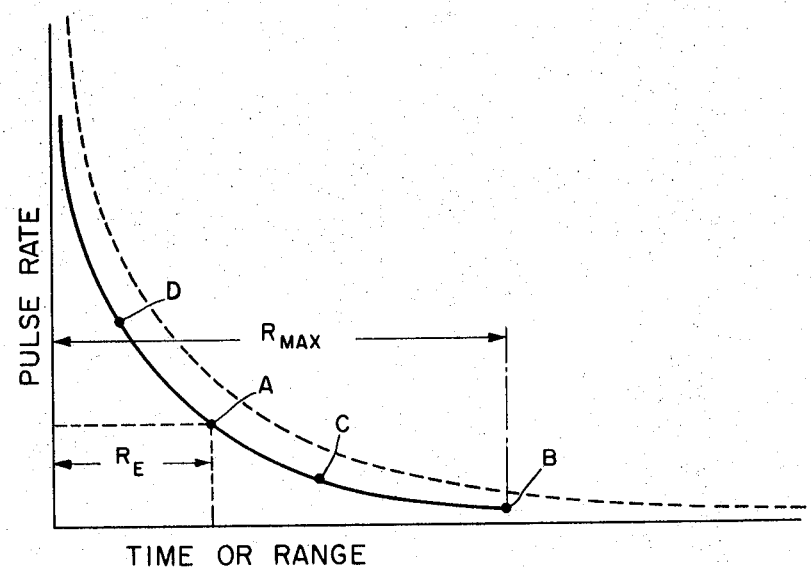
FIG. 6 is a diagram illustrating a family of curves where the pulse rate representing yield ($Yi$) varies exponentially with time or range.

In FIG. 6 is illustrated a curve depicting the exponential decay of the fallout of a detonation having a predetermined yield as a function of range from the zero—zero point. This curve also represents the pulse rate of a signal (abscissa) as a function of time of range (ordinant) of the receiver from the zero—zero point. This pulse rate decays exponentially with increase in time or range and therefore the pulse rate is equivalent to the dose rate of radioactive material. The pulses are terminated at a maximum range of $R_{MAX}$. The effective range of the receiver is indicated at $R_E$. A family of exponentially decaying curves represents different yields ($Y_i$). For example, the solid line represents one yield and the dotted line represents a higher yield.

Figure 7:
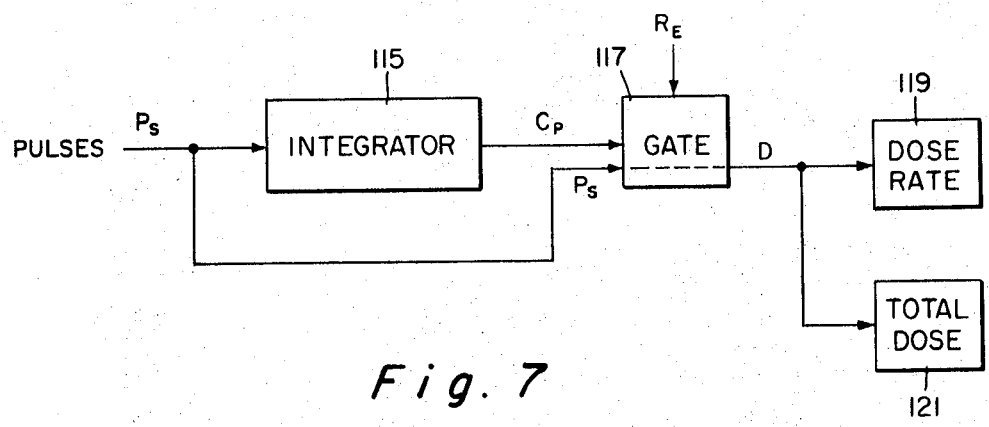
FIG. 7 is a block diagram of a circuit using the transmitted exponentially decreasing pulse rate representing yield ($Yi$) to determine the dose rate ($D$)
Figure 8:
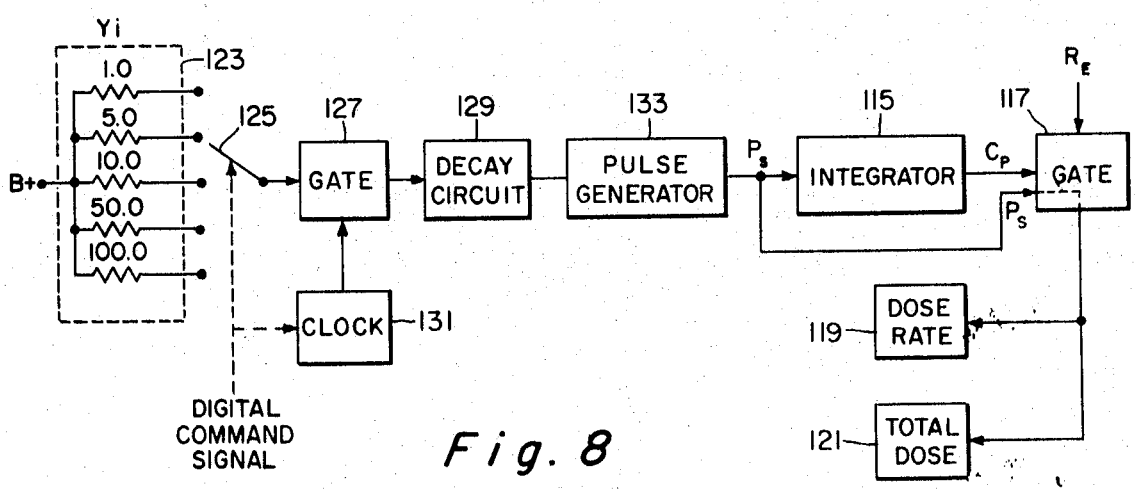
FIG. 8 is a diagram of a circuit for internally generating an exponentially decreasing pulse rate representing yield ($Yi$) to determine the dose rate ($D$).

In the FIG. 7 embodiment the pulse train represented in the curves of FIG. 6 are generated in the master transmitter 11 and are transmitted at the end of each system cycle to the receivers in the hyperbolic grid network. The input to integrator circuit 115 of the receiver is the pulse train received from master transmitter 11 that has a pulse rate $P_S$ as defined in FIG. 6. That is, the pulse rate is very rapid at the start and then decreases exponentially with time. Since the electromagnetic propagation velocity at the pulse train signal is constant, time and distance of the pulse train signal are directly related. Therefore, since the pulse rate decreases exponentially as a function of time, the pulse rate simulates or describes the exponential decay of radioactivity as a function of distance from the zero—zero point. The output of integrater 115 is a DC-voltage signal $C_P$ that increases exponentially as a function of time or distance. This signal $C_P$ is applied to one input of gate 117 where it is compared to the effective distance voltage signal $R_E$. When the voltage level of $C_P$ is equal to or greater than the voltage level of $R_E$ ($C_P \geqq R_E$) then gate 117 is turned "on" and transmits (as indicated by the dotted line) the pulse train $P_S$ directly to the inputs of dose rate meter 119 and total dose meter 121.

Referring to FIG. 6, all of the pulses in pulse train $P_S$ to the left of or above point A, (the position of the particular receiver being an effective distance $R_E$ from the zero—zero point) will not be transmitted through gate 117 because the output voltage signal $C_P$ from integrator 115 is less than the effective distance voltage $R_E$ ($C_P < R_E$). However, all of the pulses in pulse train $P_S$ to the right of or below point A will be transmitted through gate 117 (because $C_P \geqq R_E$) to the inputs of dose rate meter 119 and total dose meter 121. Dose rate meter will sample the pulse rate of the pulse train signal $P_S$ and after point A and will provide a periodic readout. For example, it will count the pulses in pulse train $P_S$ during a 0.1-second period and then readout and then repeat. However, a total dose meter 121 will integrate or count all of the pulses in pulse train $P_S$ after point A until it terminates at point B. In this manner the reading on dose rate meter 119 will simulate dose rate and the reading on total dose meter 121 will simulate total dose.

If the effective distance $R_E$ of the receiver is at point C of FIG. 6 then the dose rate meter and total dose meter will receive fewer pulses and over a shorter time span (from point C to point B) than the receiver at point A. Conversely, a receiver at point D will result in its dose rate meter and total dose motor receiving a greater number of pulses and over a longer time span (from point D to point B) than the receiver at point A.

While the system shown and described in FIG. 7 is quite satisfactory it has been found that the timing of the pulse train $P_S$ at the master transmitter is quite critical and it is also necessary to increase the overall time period of the cycle to separately transmit the pulse train $P_S$ to the receivers after the effective distance $R_E$ has been determined. The circuit in FIG. 8 overcomes these difficulties by employing a resistance network 123 which will indicate the yield ($Y_i$) as determined by the position of switch 125 the position of which is determined by a digital control signal from the master transmitter 11. The output of resistance circuit 123 is applied to the input of gate 127 the output of which is connected to the input of decay circuit 129. Gate 127 is actuated by clock 131, which is responsive to the digital control signal, so that the voltage output from resistance circuit 123 (indicating a particular yield ($Y_i$) is applied to the decay circuit 129 for a sufficient length of time to charge the decay capacitor to the output voltage level of the resistance network. Clock 131 may be actuated by the yield digital control signal and is set to open and close gate 127 at appropriate times. For example, it will be desirable to delay the start of the rundown or exponential decay of the capacitor in the decay circuit 129 until such time as $R_E$ is applied to the input of gate 117. It should be also noted that the section of the receiver shown in FIG. 8 may be operating on one cycle of information while the section of the receiver that determines the values of X and Y is operating on the next cycle of information. It can be seen that the output of decay circuit 129 is a DC signal that exponentially decreases with time and selectively describes one of the family of curves of FIG. 6. This decay signal is applied to the input of pulse generator 133 which may be a voltage controlled oscillator having a shaping circuit that provides a DC pulse train $P_S$ that has a pulse rate proportional to its input signal. The operation of integrator 115, gate 117, dose rate meter 119 and total dose meter 121 is the same as that described in reference to FIG. 7.

In view of the foregoing it can be seen that a simulation system is provided that is highly flexible, reliable and employs relatively simple electronic components. The relative simplicity of the electronics of the system makes it possible to provide a highly portable receiver which is necessary for effective mobility of the system. Although the electronics is relatively simple, the functions that it performs are quite complex and takes into account all of those parameter necessary to provide a simulation system that very closely approximates the conditions that may be actually encountered. Obviously many modifications and variations of the present invention are possible in the light of the above teachings. It is therefore to be understood that within the scope of the appended claims the invention may be practiced otherwise than as specifically described.

What is claimed is:

1. A receiver element for use in a simulation system including:
   a. a first memory means for storing an electrical signal indicating the $X$-coordinate in a rectangular coordinate system;
   b. a second memory means for storing an electrical signal indicating the $Y$-coordinate in a rectangular coordinate system;
   c. a first linear resistive adding network having first and second resistors;
   d. a second linear resistive adding network having third and fourth resistors;
   e. the output of said first memory means connected to one end of said first and fourth resistors;
   f. the output of said second memory means connected to one end of said second and third resistors;
   g. the anode of a first diode connected to the other ends of said first and second resistors;
   h. the anode of a second diode connected to the other ends of said third and fourth resistors;
   i. the cathode of each of said first and second diodes being interconnected and applied to a first input of a first adding device;
   j. a cosine function generator and a sine function generator;
   k. the output of said first memory means connected to the input of said cosine function generator;
   l. the output of said second memory means connected to the input of said sine generator;
   m. the outputs of said sine and cosine function generators being connected to respective inputs of a second adding device;
   n. an ellipse eccentricity function generator;
   o. the output of said second adding device being connected to the input of said ellipse eccentricity function generator; and
   p. the output of said ellipse eccentricity function generator being connected to a second input of said first adding device thereby adding the output of said ellipse eccentrically function generator and the outputs of said first and second diodes.

2. The device of claim 1 including:
   a. an instaneous dose means;
   b. The output of said first adding device being connected to the input of said instantaneous dose means; and
   c. Said instantaneous dose means thereby providing a signal indicating instantaneous dose.

3. The device of claim 5 wherein:
   a. said instantaneous dose means includes;
   b. a cube root device;
   c. yield signal means providing an electrical signal indicating yield;
   d. a multiplying device;
   e. the output of said first adding device being connected to the input of said cube root device;
   f. the output of said cube root device being connected to the input of said multiplying device and said yield signal means connected to the input of said multiplying device; and
   g. whereby the output of said multiplying device indicates instantaneous dose.

4. The device of claim 2 wherein:
   a. said instantaneous dose means includes;
   b. a pulse signal means providing a pulse train of electrical signals representing the yield and decay as a function of time;
   c. an integrator;
   d. a gate;
   e. said pulse signal means connected to the input of said integrator and to a first input of said gate;
   f. the output of said integrator connected to a second input of said gate;
   g. the output of said first adding device connected to a third input of said gate; and
   h. whereby the output of said gate indicates instantaneous dose.

5. The device of claim 2 wherein:
   a. said instantaneous dose means includes:
   b. a yield device for indicating yield, a first gate, a decay circuit, a clock, a pulse generator, an integrator and a second gate;
   c. the outputs of said yield device and said clock being connected to respective inputs of said first gate, the output of said first gate being connected to the input of said decay circuit, the output of said decay circuit being connected to the input of said pulse generator, the output of said pulse generator being connected to the input of said integrator and to a first input of said second gate, the output of said integrator being connected to a second input of said second gate;
   d. the output of said first adding device being connected to a third input of said second gate; and
   e. whereby the output of said second gate indicates instantaneous dose.

* * * * *